UNITED STATES PATENT OFFICE.

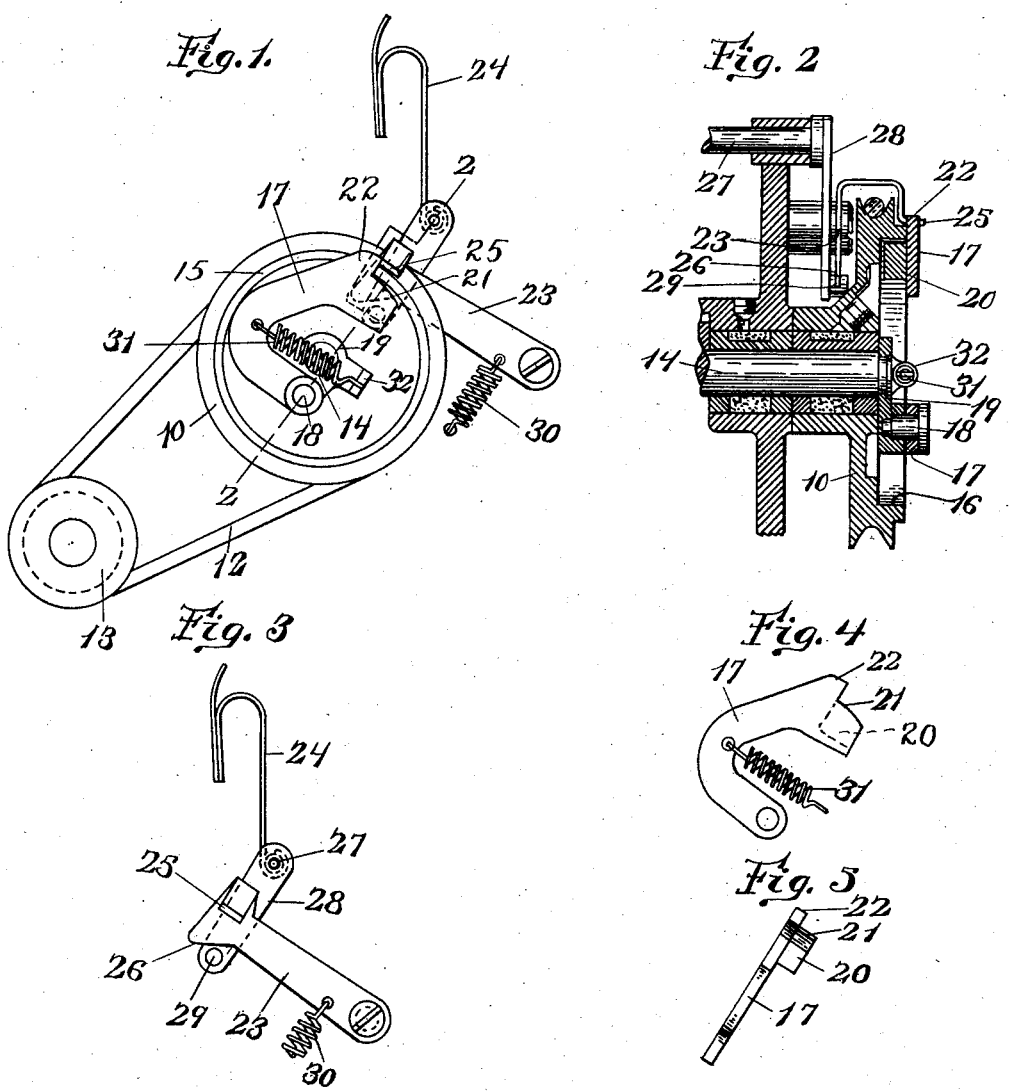

CHARLES F. RICHARDSON, OF WOONSOCKET, RHODE ISLAND, AND GERRY A. MORGAN, OF GOFFSTOWN, NEW HAMPSHIRE, ASSIGNORS TO BOSTON AUTOMATIC MACHINE COMPANY, OF BOSTON, MASSACHUSETTS, A CORPORATION OF MASSACHUSETTS.

CLUTCH.

1,062,852.  Specification of Letters Patent.  Patented May 27, 1913.

Application filed May 25, 1912. Serial No. 699,667.

*To all whom it may concern:*

Be it known that we, CHARLES F. RICHARDSON and GERRY A. MORGAN, both citizens of the United States, and residents, respectively, of Woonsocket, in the county of Providence and State of Rhode Island, and Goffstown, in the county of Hillsboro and State of New Hampshire, have invented certain new and useful Improvements in Clutches, of which the following is a specification.

The present invention relates to an improved device or mechanism adapted to be used for setting machinery in motion, and having the qualities of making substantially no noise, being able to act at any point in the revolution of the parts to be connected, and being subject to very slight wear.

The preferred embodiment of the invention is illustrated in the accompanying drawings, in which—

Figure 1 is a front elevation, Fig. 2 is a cross section on line 2—2 of Fig. 1, Figs. 3 and 4 details of the clutching member and its controller and Fig. 5 is a side elevation of the clutching member.

The same reference characters indicate the same parts in all the figures.

Referring to the drawings 10 represents a driving element which is given motion by any suitable means, such as a belt 12 driven by a pulley 13, and is mounted concentrically and loosely with respect to a shaft 14, whereby it may travel continuously without operating the shaft except when desired. This driving member has a concentric rib 15 of which the inner side forms a cylindrical surface 16.

The clutch member is indicated at 17, being conveniently in the form of an arm pivotally connected to the shaft 14 eccentrically thereof by means of a pivot stud 18 carried by a head or plate 19 which is secured rigidly to the shaft. The clutch arm has a portion 20 lying within the rib 15 and formed with a surface 21 adapted to engage the cylindrical surface 16 of such rib. The projection 20 and rib 15, with their coacting surfaces form the element of a friction clutch. A finger or lug 22 is formed on the clutch arm 17 and extends across the rib 15.

The means for controlling the clutch is shown particularly in Fig. 3 and consists of a stop arm 23 and an actuator 24. Said stop arm has a finger 25 extending across and partly around the rim of the driving element (as appears in Fig. 3) and lying beside the lug 22 and constituting an abutment therefor, and said arm has also a cam or wedge portion 26. The actuator is secured to a shaft 27, upon which also is secured an arm 28 carrying a stud 29 which lies beneath the cam edge 26 of the stop arm. Movement of the actuator 24 to the right with respect to Figs. 1 and 3 causes the stud 29 to elevate the stop arm while movement in the other direction allows the stop arm to descend under the force of gravity and of a spring 30.

The stop or abutment 25 normally lies in the path of the finger 22, but when raised as above described it is displaced from in front of the finger, whereupon the clutch arm is left free to be moved by a spring 31, which is connected at one end to such clutch arm and at the other to a lug 32 on the head 19. Owing to the eccentric mounting of the arm 17, the clutch face 21 is thereby caused to engage the complemental cylindrical surface 16.

The pivot 18 is located on the opposite side of the shaft 14 from the clutch element 20, and its distance from the face 21 of this element is slightly less than the sum of the radius of the surface 16 and the eccentricity of this pivot. Hence when the line between the pivot and clutch element is radial to the driver, the clutch face 21 is out of engagement with the surface 16. This is the position which it assumes when arrested by the stop 25 as indicated in Fig. 1. Movement of the clutch arm in either direction from this neutral position brings the clutch faces into engagement. The spring 31 is so arranged as to move the clutch arm in the direction of motion of the driver 10 whereby the pull of the spring and the force of the driver coöperate in effecting connection of the clutch. It is to be noted that the eccentricity of the pivot 18 is not great, and that in consequence the path traveled by the clutch element makes a very fine acute angle with the surface 16. This has the effect of mimimizing tendency to slip and cause the clutch element to grip with the utmost firmness. As a consequence the power of the clutch automatically increases in proportion to an increase in the resistance to turning of the shaft 14. Also the face 21 is comparatively long in the driving direction and is so curved as to fit throughout its length evenly against the surface 16, thereby increasing the power of the clutch and diminishing its tendency to wear.

The foregoing comprise the essential and most important features of the mechanism. In the particular embodiment here shown details of construction and arrangement have been adopted which may be considerably altered without departing from the spirit of the invention. For instance, the clutch element 20 is made as a block fastened on the side of the arm 17, but it might be otherwise constructed. As here shown also the abutment finger of the stop arm is on one side of the driver 10 while the stop arm as a whole and its cam portion 26, together with the arm 28, are on the other side of the driver, the abutment being carried around the rim of the driver as shown in Fig. 2. This arrangement is not essential to the invention but may be altered if desired. Again we have chosen to show the clutch as adapted to engage the inner surface of the rib 15, but we do not thereby intend to restrict our claims to this arrangement, or to imply that the claims are not of sufficient scope to cover any construction, however modified, which is capable of securing the same or equivalent effects. The driven element 14 is here shown as a shaft and the driver 10 as a belt pulley, but these particular elements are merely typical of any driven member and any driver, respectively, and they are shown simply for illustration and with no intention of limiting the application of the invention to any particular machine or class of machines.

We claim:

1. The combination with a rotatable driven member, of a rotary driver independently movable with respect to the driven member and having a cylindrical surface concentric with the common axis of rotation, a clutch member pivotally connected with said driven member eccentrically of such axis and having a portion complemental to, and in the zone of such cylindrical surface, yielding means tending constantly to swing said clutch member in the direction of rotation of the driver, a stop in the path of the clutch member, and means for displacing said stop.

2. The combination with a rotatable driven member, of a rotary driver independently movable with respect to the driven member and having a cylindrical surface concentric with the common axis of rotation, a clutch member having an active portion complemental to such cylindrical surface, pivotally connected to the driven member at such a point that movement about its pivot in either direction from a neutral position will bring its active portion into contact with the cylindrical surface, yielding means tending constantly to swing the clutch member about its pivot in the direction of rotation of the driver, and means for rendering the clutch member operative and inoperative.

3. A driving mechanism comprising a driver and a driven member, both rotatable about the same axis independently of one another and the driver having a rib concentric with such axis formed with an interior cylindrical clutching surface, a clutch arm pivotally connected to the driven member eccentrically of the axis and having an active element lying within and near the said cylindrical surface on the opposite side of the axis from its pivot, the distance of such element from the pivot being greater than the radius of the cylindrical surface and less than the combined length of this radius and the eccentricity of the pivot, yielding means tending to swing the clutch arm about its pivot in the same direction as that in which the driver rotates, and a stop member movable into and out of contact with a part of the clutch arm.

4. The combination of a driver normally in continuous rotation having a cylindrical clutching surface concentric with its axis, a driven member adapted to rotate about the same axis, a clutch member pivotally connected to the driven member eccentric to such axis and having a complemental face adapted to coact with the cylindrical surface, the pivot and face of said member being located at correspondingly the same side of the axis and the portion of the cylindrical surface nearest to such face, respectively, means tending yieldingly and constantly to swing the clutch arm about its pivot in the direction of rotation of the driver, and a stop normally in the path of the clutch arm and displaceable from such path.

5. A driving mechanism comprising a driven member, a pulley normally in continuous rotation and loose with respect to said driven member, said pulley having a rib with a clutch face concentric with the driven member, a clutch member pivotally connected with the driven member eccentrically thereof, means normally tending to bring the clutch member into frictional engagement with the said concentric surface, a stop in the path of said clutch member for arresting the same and holding it out of engagement with said surface, and means for displacing said stop from said path.

6. A driving mechanism comprising a rotatable shaft, a constantly rotating wheel loosely mounted concentrically with said shaft and having a smooth cylindrical surface also concentric therewith, a plate secured to the shaft, a clutch arm pivoted upon said plate having a clutching portion lying adjacent to said concentric surface, the pivot of the arm being eccentric to the shaft, a spring arranged to exert force on said arm in such direction as to tend to swing it about its pivot in the direction of rotation of the wheel, whereby to bring the clutching portion into frictional engagement with the concentric surface, a stop in the path of a portion of said arm normally resisting movement thereof and of the shaft, and means controlled by the operator for displacing the stop from such path.

7. A driving mechanism comprising the combination of a supporting structure including a side frame, a shaft having a bearing in said side frame, a driving wheel loosely mounted upon said shaft and having a cylindrical surface concentric therewith, means for rotating said pulley, a clutch arm pivotally connected with the shaft eccentrically thereof, located on the outer face of the pulley, and having a portion located within the circle bounded by the concentric face of the driving wheel and located also on the opposite side of the axis of the shaft from the pivot of said arm, a spring connected with said arm tending to move the same about its pivot in the direction of rotation of the driver, an arm pivoted to the frame between the latter and the driver and having a stop extending around the driver into the path of a portion of said clutch arm, whereby to engage the latter and arrest movement thereof of the shaft, an arm mounted upon the side frame and adapted to swing, having a stud engaging a cam portion of said lever, and means by which the operator may swing said arm in a direction such as to remove the stop from the path of the clutch arm.

In testimony whereof we have affixed our signatures, in presence of two witnesses.

CHARLES F. RICHARDSON.
GERRY A. MORGAN.

Witnesses:
  CHARLES E. CLARK,
  GEORGE M. MCGINLEY.

---

Copies of this patent may be obtained for five cents each, by addressing the "Commissioner of Patents, Washington, D. C."